United States Patent
Tcholakov

[11] Patent Number: 5,839,338
[45] Date of Patent: Nov. 24, 1998

[54] WIRE STEEL ROPE CUTTER MACHINE

[76] Inventor: Stoil Metodiev Tcholakov, 5304 Hames Trace, Apt. 117, Louisville, Ky. 40291

[21] Appl. No.: 720,188

[22] Filed: Sep. 25, 1996

[51] Int. Cl.[6] .................................. B26D 1/08; B26D 7/02
[52] U.S. Cl. .................................. 83/375; 83/452; 83/465; 83/633; 83/635; 83/646
[58] Field of Search .............................. 83/175, 456, 626, 83/627, 630, 632, 633, 634, 635, 375, 385, 452, 465, 625, 644, 646

[56] References Cited

U.S. PATENT DOCUMENTS

| | | | |
|---|---|---|---|
| 1,419,789 | 6/1922 | Webb | 83/635 X |
| 1,538,635 | 5/1925 | Hahn | 83/627 X |
| 1,559,083 | 10/1925 | Friederici | 83/627 X |
| 2,761,378 | 9/1956 | Lancaster | 83/456 X |
| 3,726,170 | 4/1973 | Von Hofen | 83/632 X |
| 3,817,139 | 6/1974 | Desai | 83/456 X |

FOREIGN PATENT DOCUMENTS

| | | | |
|---|---|---|---|
| 564727 | 11/1932 | Germany | 83/385 |
| 737137 | 7/1943 | Germany | 83/630 |
| 2006662 | 5/1979 | United Kingdom . | |

*Primary Examiner*—Clark F. Dexter
*Attorney, Agent, or Firm*—Rodney L. Skoglund

[57] ABSTRACT

A wire rope cutter machine has at least a first and pair of jaws for holding the rope to be cut taut and a cutting blade for cutting the rope. The cutting blade has a "V"-shaped cutting edge and the bottom jaw of the first pair of jaws has a "V"-shaped edge which is off-center and displaced from the middle of the "V"-shaped edge of the cutting blade to permit a four-edge pivoting cutting process.

3 Claims, 1 Drawing Sheet

WIRE STEEL ROPE CUTTER MACHINE

FIELD OF THE INVENTION

The present invention is directed to a machine for cutting a wire steel rope or other material cables. In particular, but not exclusively, the invention relates to such a steel rope cutter moved by different powers, as electric, hydraulic, pneumatic, or man-power.

BACKGROUND OF THE INVENTION

One known cable cutter, presently available on the market, is based upon U.S. Pat. Nos. 1,743,404 and 1,769,001 filed in 1926 and 1928, respectively, and has two base plates with a gap between them, forming the die, where the gap allows the cutting blade to slide between the plates. The open-ended housing allows a cable to be introduced thereinto, and a blade movable in the housing an encircling means to cut the cable.

The above-referenced known cable cutter has the following disadvantages.

There is friction between the two sides of the blade and the opposed side walls of the die when the blade is slid between the die. This friction, in turn, increases the amount of power required to be applied to the blade in order to cut the cable, thereby reducing the efficiency of the whole mechanism. The thickness of the blade, or the size of the gap between two side walls of the die produces a waste-product of unusable cable pieces.

For example, in order to cut 60 pieces of cable each having a length of 10 inches, 600 inches plus 59 times the thickness of the blade of the cable cutter is required, thereby producing a waste-product is to reduce the thickness of the blade. But the thickness of the blade cannot be reduced because a blade which is too thin will become breakable due to both the cutting power required of the blade and the sliding friction acting between the blade and the side walls of the die. The only way to reduce the sliding friction between the blade and the die side walls is to increase the gap between the side walls of the die. But this causes another negative side effect. The process of cutting is turned into a process of tearing the small wires composing the rope or the cable. This makes the cut surface of the rope or cable uneven and rugged and increases the length of the waste-product. The process of tearing the small wires of the steel ropes increases dramatically the power required for cutting the rope. In other words it reduces the efficiency of the rope cutter machine.

Thus, there exists a need for a light durable wire steel rope cutter machine with small size, high efficiency, low cost, and made from inexpensive materials.

SUMMARY OF INVENTION

The present invention relates to a rope cutter machine for cutting wire ropes and cable made of steel and other materials, comprising a housing, a first and second pair of jaws to hold the rope taut, each pair of jaws including a stationary lower jaw and an upper pressing jaw, the lower jaw of the first pair of jaws having a "V"-shaped edge, first and second pivotable plates parallel to one another, each plate being operatively connected at one end to the respective upper pressing jaw of the first and second pair of jaws, a spring operatively connected to an opposing end of both the first and second pivotable plates, a first axle attached to the housing and received through the first and second pivotable plates distal from the ends of the first and second pivotable plates so as to permit the pivotable plates to pivot therearound, at least one pivotable arm having one end operatively engaging the top of the first and second pivotable plates, a mechanism to actuate the machine including a connecting rod operatively communicating with an opposing end of the pivotable arm, a second axle attached to the housing and received through the at least one pivotable arm distal from the ends thereof so as to permit the at least one pivotable arm to pivot therearound, and a cutting blade operatively connected to the pivotable arm between the axle and the connecting rod and positioned in substantially parallel relationship between the first and second pairs of jaws, the cutting blade having a "V"-shaped cutting edge, wherein the tracked movement of the middle of the "V"-shaped cutting edge of the cutting blade is off-center and displaced from the middle of the "V"-shaped edge of the lower jaw of the first pair of jaws when the mechanism is actuated to pivot the pivotable arm, thereby lowering the cutting blade for cutting the wire rope, and wherein the pivoting of the pivotable arm causes the pivoting of the first and second pivotable plates so as to lower the upper pressure jaws and hold the wire rope taut.

In a preferred embodiment of the wire steel rope cutter machine in accordance with the invention, the first and second pairs of jaws for holding the rope taut have a distance between them which is significantly greater than the thickness of the cutting blade. The cutting blade is operatively positioned to slide along the opposing side of the bottom of the bottom jaw of the first pair of jaws. The cutting blade is positioned a distance away from the opposing side of the second pair of jaws however.

Preferably, the bottom jaw of the first pair of jaws comprises a "V"-shaped cutting edge. The "V"-shaped edge of the cutting blade has a cutting angle of about 6 degrees, and its tracked downward movement is such that the middle line of the "V"-shaped angle of the blade is off-center and displaced from the middle line of the "V"-shaped angle of the bottom jaw of the first pair of jaws, providing for a process of four -edge pivoting cutting.

Compared with the previously known cable cutters described above, the advantages of the wire steel rope cutter machine in accordance with the present invention and having the preferred features mentioned above are as follows.

It is cheaper to manufacture, since most of the parts (even the gearwheel) can be made from plastics except for the bottom jaw of the first pair of jaws and the cutting blade. It is faster to manufacture, since the plastic parts and the threads in them can be made by extrusion. The friction caused by sliding the blade between the two side walls of the dies is reduced because of the upper jaw of the first pair of jaws moving in the same direction as the blade, and because there is no surface to provide friction on one side of the blade. The thickness of the blade does not produce any waste-product from the rope. The wire steel rope cutter machine produces smooth straight cuts because of the new process of four-edge pivoting cutting.

BRIEF DESCRIPTION OF THE DRAWINGS

The invention will now be described, by way of example, with reference to the accompanying drawing, in which.

DETAILED DESCRIPTION OF PREFERRED EMBODIMENT

Figure 1:
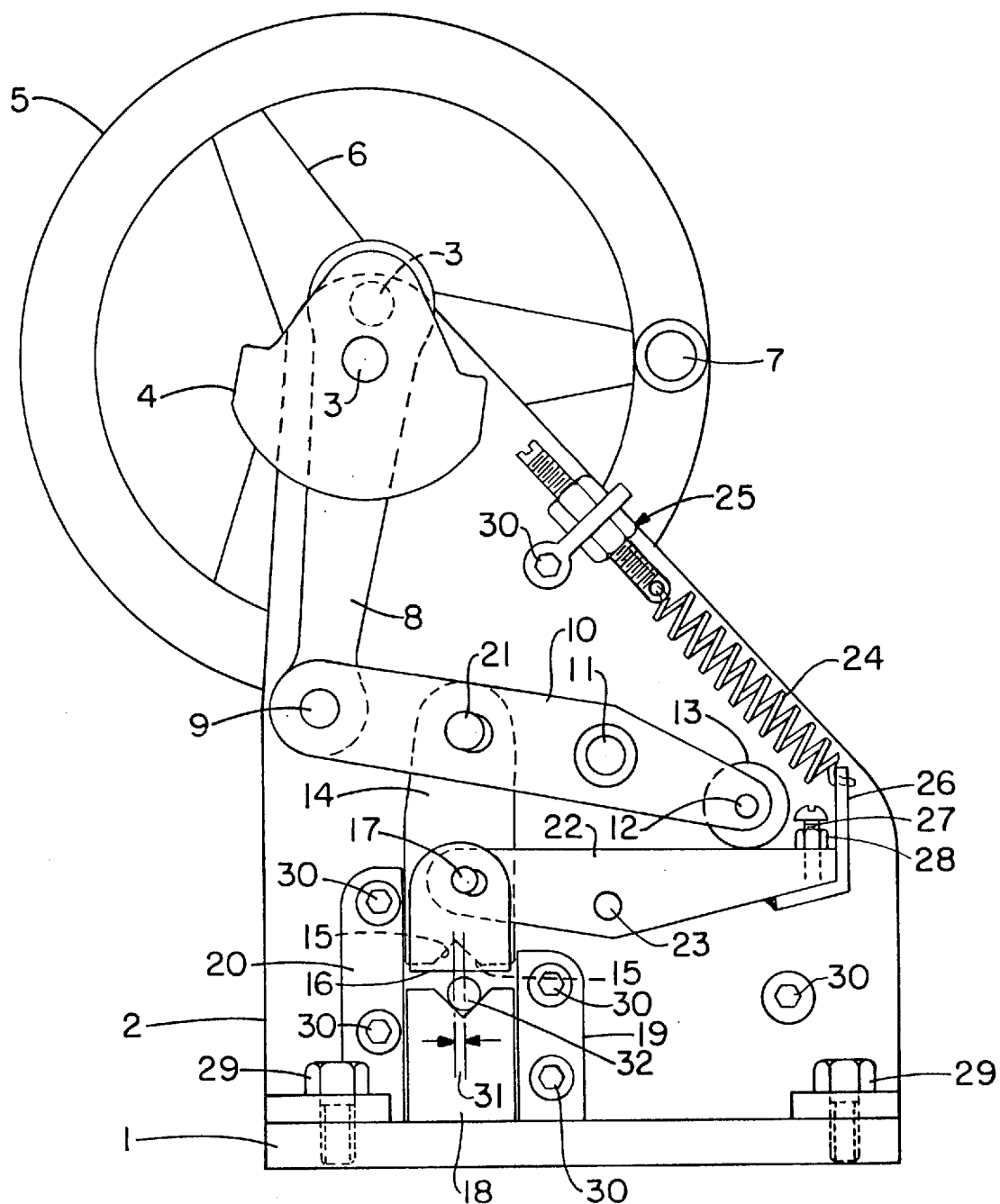
FIG. 1 is a side view with one side wall of the housing removed to show one embodiment of a wire steel rope cutter machine in accordance with the invention.

The wire steel rope cutter machine includes a housing comprising a base plate 1 and side plates 2. A mechanism for actuating the cutter machine includes a crankshaft 3, counterweights 4, gearwheel 5, which may be replaced by a pulley, or a handle flywheel, spokes 6 of the gearwheel, a handle 7, connecting-rod 8, and a bearing 9 for operatively connecting the connecting-rod to at least one pivotable arm 10 positioned inside of the formed housing. An axle 11 is attached to the side plates 2 of the housing and is received through a portion of the pivotable arm(s) 10 so that the arm may pivot therearound. At one end of the pivotable arms 10 is a roller 13 connected to the arms by an axle 12 such that the roller 13 is free to rotate. A cutting blade 14, having two cutting edges 15, which together form a "V"-shape is connected to the pivotable arm(s) 10 by axle 21 located between axle 11 and bearing 9, wherein the axle 21 is connected to the pivotable arm 10 through an elongated opening in the pivotable arm 10 to permit translational and pivotal movement between the cutting blade 14 and the pivotable arm 10. In parallel relation to the blade 14 is at least one pair of jaws, each pair of jaws comprising an upper pressing jaw 16 and a stationary bottom jaw 18. Axle 17 connects the upper pressing jaw 16 to the pivotable plates 22 through an elongated opening in the pivotable plates 22. Parallel guides 19 and 20 are used for guiding the upper pressing jaw 16 and cutting blade 14 during their movement downward toward bottom jaw 18, and for fixing each bottom jaw 18 in its stationary position. Pivotable plates 22 are connected to the upper pressing jaws 16 at one end. A coil spring 24 is attached, as described hereinbelow, and assures that tension will be placed on the upper pressing jaw to ensure that they will hold the wire rope taut. An axle 23 is attached to side plates 2 of the housing and is received through the first and second pivotable plate distal from the ends thereof so as to permit the pivotable plates to pivot about the axle 23.

Coil spring 24 may be connected to both the first and second pivotable plate by a plate 26 which is preferably welded to the first pivotable plate 22 and not welded to the second pivotable plate 22. The second pivotable plate 22 may be attached to the plate 26 by an adjustable bolt 27 at the end of the plate approximate to the spring 24 in order to regulate the tension on the first pair of jaws in correlation with the second pair of jaws. Of course, a nut 28 may be used to affix the bolt 27 in the required position. An adjustable spring tension device 25, as is well known in the art may also be used to adjust the tension of the spring 24.

Means such as bolt 29 may be used for adjusting and affixing the side plates 2 to the base plate 1. Additional means, such as bolts 30 may connect the side plates 2 of the housing to the parallel guides 19 and 20 of the cutter machine.

It will be appreciated that the "V"-shaped bottom jaw of the first pair of jaws is off-center and displaced from the "V"-shaped cutting edge of the cutting blade 14. Accordingly, tracking the movement of the cutting blade 14 from the middle of the "V"-shaped cutting edge and the middle of the "V"-shaped edge of the bottom jaw shows that the two cutting paths are displaced by a distance 31. This enables the cutting machine to perform the four-edge pivoting cutting process of the wire steel rope 32.

In use the above-described wire steel rope cutter machine begins its operation by causing the gearwheel 5 to rotate in a counter-clockwise direction so as to exert maximum radial pressure of the pivotable arm(s) 10. Connecting-rod bearing 9 is forced down thereby forcing the cutting blade 14 downwards as well. At the same time, axle 12 and roller 13 at the other end of the pivotable arm(s) 10 are forced up, thereby permitting the ends of the pivotable plates 22 proximate to the spring 24 to move upwards due to the tension of the coil spring 24, thereby pushing the other ends of the pivotable plates 22 downwards and forcing the upper pressing jaws 16 downwards until the jaws are pressing on the top surface of the wire steel rope 32. The upper pressing jaws (16) stop their movement at this point, but the cutting blade (14) continues its movement downwards and starts the process of four-edge pivoting cutting. The next half turn of the gearwheel 5 forces the blade 14 up and opens the jaws 16 to their initial position, as shown in FIG. 1.

What I claim is:

1. A wire steel rope cutter machine for cutting a wire rope comprising:

a housing;

a pair of jaws including a stationary lower jaw fixed to said housing and an upper pressing jaw, said lower jaw having a "V"-shaped edge;

a pivotable plate operatively connected at a first end to the upper pressing jaw;

a spring operatively connected to said housing and to a second end of said pivotable plate;

a first axle attached to said housing and received through said pivotable plate distal from said ends of said pivotable plate so as to permit said pivotable plate to pivot therearound;

at least one pivotable arm having a first end operatively engaging a top of said pivotable plate;

a mechanism to actuate the machine including a connecting rod operatively connected to a second end of said pivotable arm;

a second axle attached to said housing and received through said at least one pivotable arm distal from said ends thereof so as to permit said at least one pivotable arm to pivot therearound; and a cutting blade operatively connected to said pivotable arm for translational and pivotal movement relative to said pivotable arm, said cutting blade being connected to said pivotable arm between said axle and said connecting rod and positioned in substantially parallel relationship adjacent said pair of jaws, said cutting blade having a "V"-shaped cutting edge, wherein a tracked movement of the middle of said "V"-shaped cutting edge of said cutting blade is off-center and displaced from the middle of said "V"-shaped edge of said lower jaw of said pair of jaws when said mechanism is actuated to pivot said pivotable arm, thereby lowering said cutting blade for cutting the wire rope, and wherein the pivoting of said pivotable arm causes the pivoting of said pivotable plate so as to lower said upper pressing jaw to hold the wire rope.

2. The wire steel rope cutter machine of claim 1, further comprising parallel guides mounted in parallel alignment adjacent said pair of jaws and said cutting blade for guiding said upper pressing jaw and said blade into position to hold and to cut the rope, respectively.

3. The wire steel rope cutter machine of claim 1, further comprising an adjustable tension device operatively attaching said spring to said housing for selectively adjusting the tension of said spring.

* * * * *